April 15, 1969 L. R. REID ET AL 3,438,694
WIDE BAND PELLICLE BEAM SPLITTER FOR INTERFEROMETRY
Filed Oct. 18, 1965 Sheet 1 of 2
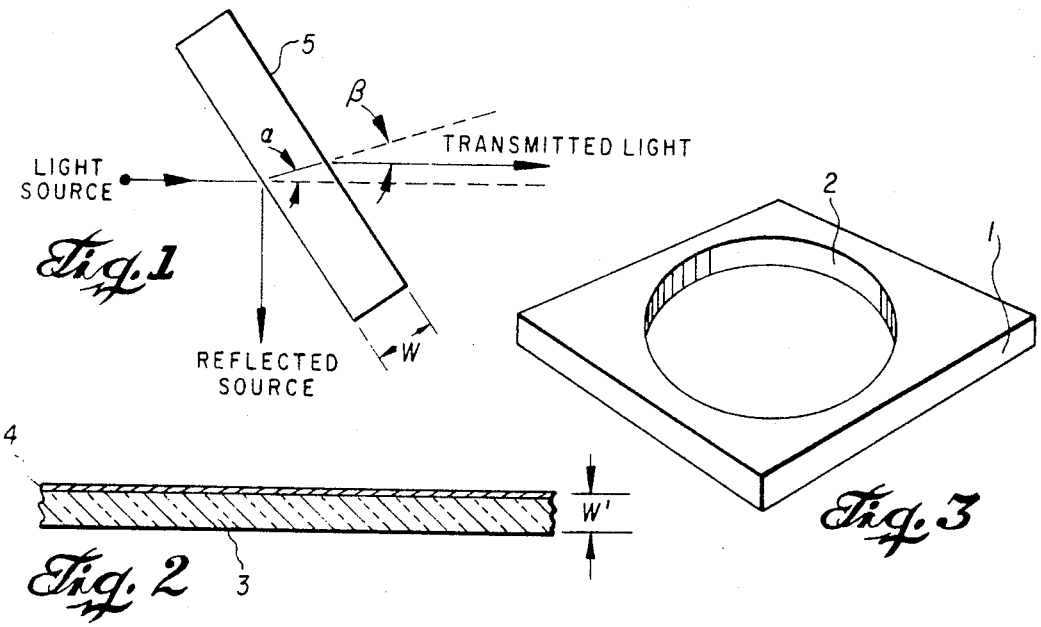
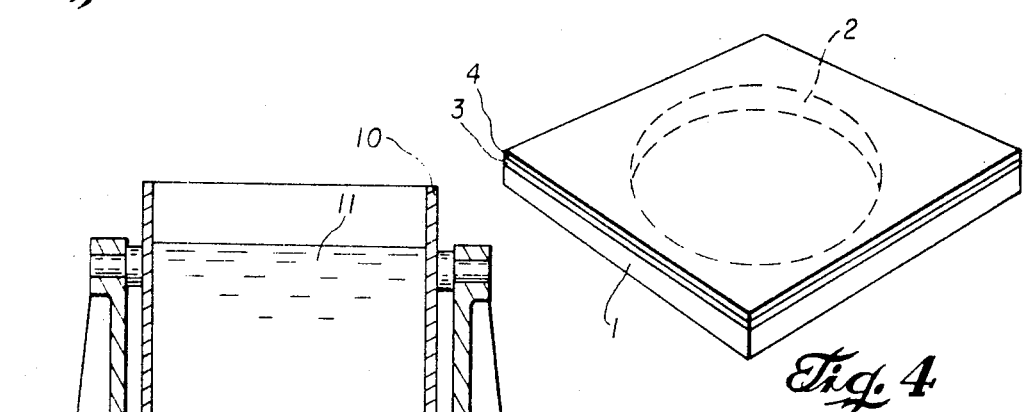
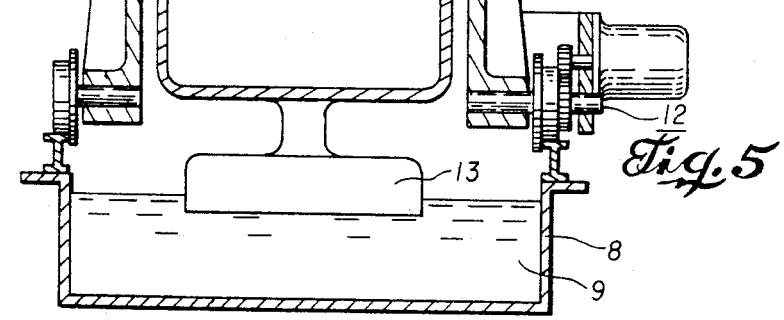
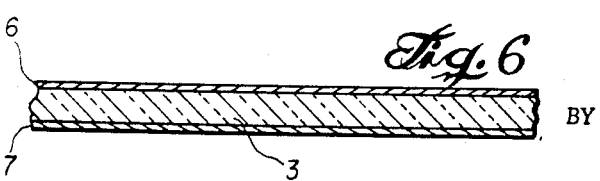
INVENTOR
Lee R. Reid
Robert H. Berkshire
BY
William E. Johnson Jr.
ATTORNEY

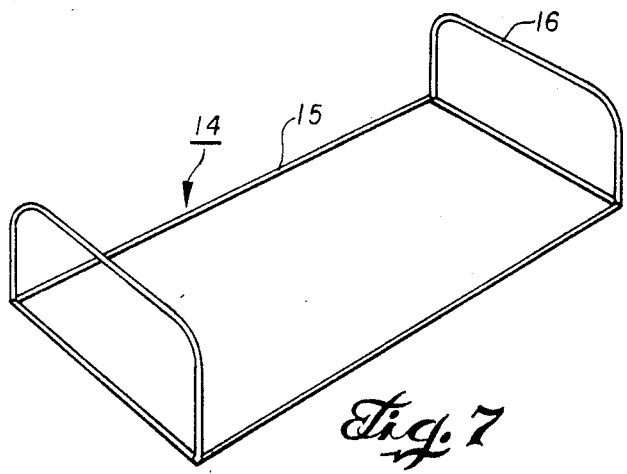
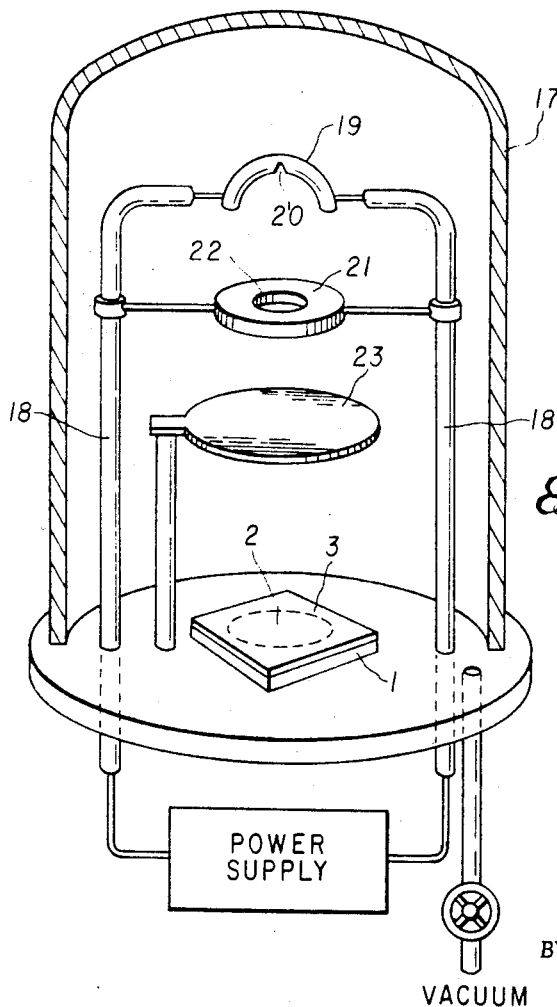

United States Patent Office 3,438,694
Patented Apr. 15, 1969

3,438,694
WIDE BAND PELLICLE BEAM SPLITTER FOR INTERFEROMETRY
Lee R. Reid, Richardson, and Robert H. Berkshire, Dallas, Tex., assignors to Texas Instruments Incorporated, Dallas, Tex., a corporation of Delaware
Filed Oct. 18, 1965, Ser. No. 497,294
Int. Cl. G02b 27/14
U.S. Cl. 350—171       4 Claims

ABSTRACT OF THE DISCLOSURE

Disclosed is a beam splitter and a method for making it, the beam splitter comprising a one micron thick optically flat pellicle of a nitrocellulose material having deposited on one surface a thin semireflective coat which partially reflects and partially transmits a beam of light incident thereupon. The method for making the beam splitter includes the steps of releasing a highly volatile collodion mixture onto a surface of water; allowing the mixture to solidify to form an extremely thin film pellicle; removing the pellicle with a wire holder; and subjecting the pellicle to a vapor of a reflective material released in a measured amount through a shutter.

---

This invention relates to extremely thin films and to methods for making the same. More specifically, it relates to a pellicle-type beam splitter fabricated by applying a semi-mirrored coating to the surface of an extremely thin film.

Beam splitters have been known in the art for many years, having found utility as the heart of the interferometer described by the late Professor Michelson in 1881. The beam splitter is normally used to divide light beams into two components. One component, after being reflected one or more times, is united in an optical array with the other component to form an interference pattern, one of the purposes of such a pattern being to measure the wave length of light. There have been a number of different methods for fabricating beam splitters, but all have been plagued by the need for a compensator plate. Such a plate has been necessary because of the bending of the light rays when they pass through a medium other than air, the amount of bending being dependent upon the index of refraction of the medium through which the light passes.

If light is to be considered as a wave disturbance passing from one medium to another, it is axiomatic that the frequency of the wave must be the same in both media; otherwise the disturbance in the first medium at the boundary would periodically become out of phase with respect to the disturbance in the second medium at the boundary, and this would produce fluctuations, which are not observed. But the measurements of the physicists Foucault and Michelson show that light travels more slowly in media such as water or glass than in air, and since in any medium the product of wave length and frequency is equal to the velocity of light in that medium, it follows that the wave length of a given kind of light must be less in a medium such as glass than in air. In order to eliminate the bending and shortened wave length effect, the beam splitter would of a necessity have a width (transmission path) which is small compared to the wave length of the light beam passing through the plane, or at least be approximately the same width. In dealing with wave lengths of light, it is convenient to speak of either angstrom (symbol A.) units, which are the equivalent to .0000001 mm., or to microns, which are equivalent to .001 mm. From these figures it is seen that 10,000 A. are equal to one micron. As an example of the width required for a film to function as a beam splitter without bending the light beam, infrared light has a wave length of 7600 A. or greater, which is .76 micron or greater. For use with slightly longer wave lengths, for example in the five to thirty micron range, the width of the film should preferably be some fraction of five microns, perhaps one micron. In addition to the film or pellicle being approximately one micron thick, the beam splitter must be semi-mirrored and optically flat.

It is therefore an object of the invention to produce a pellicle-type beam splitter which requires no compensator plate to have utility in an interferometer.

It is a further object of the invention to produce a self-supporting semi-mirrored thin film approximately one micron or less in width and provide a method for making such a thin film.

It is still another object of the invention to provide a very thin film of self-supporting insulating material.

It is yet another object of the invention to provide a very thin film of insulating material having metal evaporated onto both sides of the film.

In accordance with this invention, a very thin film of nitrocellulose in formed and then coated with tellurium and or/ germanium for example, to thus provide a semi-mirrored film suitable for use as a self-supporting (no substrate needed) pellicle-type beam splitter.

The novel features believed to be characteristic of the invention are set forth in the appended claims. The invention itself, however, as well as further objects and advantages thereof, will best be understood from the following detailed description of illustrative embodiments, when read in conjunction with the accompanying drawing wherein:

FIGURE 1 illustrates a schematic representation of a prior art beam splitter;

FIGURE 2 illustrates a sectional view of a metallic film on a collodion film fabricated according to the invention;

FIGURE 3 illustrates a pictorial view of a beam splitter housing apparatus according to the invention;

FIGURE 4 illustrates a pictorial view of the combined films of FIGURE 2 mounted on the housing apparatus of FIGURE 3;

FIGURE 5 illustrates a pictorial view of a liquid tank and controlled-release mechanism for distributing a liquid film solution.

FIGURE 6 illustrates a sectional view of a thin film capacitor according to the invention.

FIGURE 7 illustrates a pictorial view of a wire holder for picking up a film from the liquid in the tank shown in FIGURE 5; and FIGURE 8 illustrates a pictorial view of an evaporation chamber for forming a semi-mirrored surface on a pellicle film fabricated according to the invention.

Referring now specifically to FIGURE 1, there is illustrated a conventional beam splitter. As the light source comes into contact with the beam splitter 5, a component of the light is reflected, another component is transmitted and still another component is absorbed. For ease of illustration, the absorbed component is disregarded, not being illustrated. Because of the index of refraction of the beam splitter material, the transmitted light component is bent through an angle $\alpha$ until it again reaches the surface, at which time it is bent through an angle $\beta$. As is well-known in the art, when a light beam passes from a less optically dense medium (air, for example) into a more optically dense medium (glass, for example), the beam will be bent toward the normal, whereas in passing out of the glass the beam will be bent away from the normal, the normal being defined as a line or plane perpendicular to the surface of the glass. Thus the conventional beam splitter, having some width $w$, bends the transmitted component through an angle $\alpha$ and an angle β, resulting in a slower beam while it is inside the material and one that has been displaced from its original path. The prior art uses a compensating plate (not illustrated) to correct for the displacement, while either disregarding or neglecting the decrease in velocity of the transmitted component.

In FIGURE 2 there is illustrated a beam splitter according to the present invention which has a width $w'$. If $w'$ is small compared to the wave length of transmitted light, the bending effect and decreased velocity which occurs with the conventional beam splitter of FIGURE 1 is avoided, thus eliminating the need for the compensating plate. The combined width of the collodion film 3 and the semi-mirrored finish 4 are fabricated according to the invention to be approximately one-half to one micron, which is small compared to the wave length of infraraed light in the commonly used range of five to thirty microns.

FIGURES 3 and 4 illustrate a holding apparatus 1 upon which the beam splitter of FIGURE 2 can be mounted. The holder 1, which can be of any suitable material, for example, aluminum, has an aperture 2 so that the central portion of films 3 and 4 can be used for splitting a light beam.

FIGURE 5 illustrates a tank 8 having a liquid 9 therein, for example distilled water. A fluid container 10, having a plain or flexible collodion 11 therein, is arranged to travel along a motorized track assembly 12, and has a controlled outlet 13 to release the collodion onto the water as the container 10 moves along the track. The plain collodion is commercially available from J. T. Baker Chemical Company in Phillipsburg, N.J., and constitutes a solution having the following approximate proportions: 4 grams pyroxylin (chiefly nitrocelluose) in 100 milliliters of a mixture of 1 volume alcohol and 3 volumes ether. The flexible collodion is commercially available from Merck Chemical Company in Rahway, N.J., and constitutes a solution having the plain collodion described above in addition to 2% camphor and about 3% castor oil. The preferred embodiment includes the evaporation of substantially all the ether from the flexible collodion and subsequently redissolving the residue in acetone. 10% butyl acetate and 2% amyl acetate are then added to the mixture 11 of FIGURE 5.

After the modified flexible collodion 11 is released onto the water 9, the collodion, being lighter than water, will form an extremely thin film (pellicle) on the surface and will become solidified in a matter of seconds. Since the collodion mixture is highly volatile, a portion will be lost to vaporization, and thus the film volume will be reduced by that amount which is lost. As an example of the volume of the collodion liquid needed to make a film, it has been found that approximately 2 milliliters (about 2 cc.) will produce a film 2 feet wide, 3 feet long and ½ micron thick. A wire holder 14 (FIGURE 7) having handles 16 and a wire frame 15, is coated with rubber cement and allowed to dry. A technician can cut the film from around the surface periphery of the water 9, leaving the film free-floating, after which the technician brings frame 15 of the wire holder 14 into contact with the film. The adhesive forces between the holder and the film enables the film to cling to the frame and thus be removed from the water. The film is then washed with distilled water to remove dust or other surface particles and placed on the holder of FIGURE 3.

The holder 1 and film 3 are then placed into the evaporation chamber 17 of FIGURE 8. Between the heater leads 18 is the combined heater and tubular boat assembly 19 for the material to be evaporated for example, tellurium, said tubular boat having a small aperture 20. Beneath the boat is a heat shield 21 with another small aperture 22, and beneath the heat shield is a shutter 23. Because of the extremely thin character of the pellicle 3, extreme care must be taken not to damage it, such as by overheating. By heating the boat up to the desired temperature for evaporation of the tellurium with the shutter 23 closed to protect the pellicle, and then opening the shutter for about 10 seconds to allow the tellurium to fall upon the pellicle and then closing the shutter again for about 20 seconds to allow the pellicle to cool, the pellicle will be prevented from rupturing. After the pellicle has cooled, the process can be repeated for additional layers if desired. The 10 second evaporation period during which the shutter is open will produce a semi-mirrored film approximately 500 A. thick, the mirrored film being a negligible part of the overall thickness.

FIGURE 6 shows a capacitor fabricated according to the invention wherein the thin collodion film 3 has aluminum contact layers 6 and 7, for example, as by the aforementioned evaporation process. Other metals which could be used for the contact layers on this thin film capacitor include gold, silver or any of the other contact materials known in the art.

While the invention has been described with respect to the preferred embodiments, it should be appreciated that other materials can be used to form the semi-mirrored film, either individually or in combination, on the collodion film, including gold, germanium, lead, potassium bromide, sodium chloride, lead flouride, bizuth oxide and antimony oxide.

What is claimed is:
1. A pellicle light beam splitter for interferometer applications comprising:
  (a) a first optically flat thin film of nitrocellulose having a width of approximately 0.5 to 1.0 micron;
  (b) a semi-mirrored second optically flat metallic film on one side of the said first film, and having a width which is much less than that of said first film; and
  (c) mounting means for said first and second films.
2. The beam splitter according to claim 1 wherein said second film comprises a layer of evaporated germanium.
3. The beam splitter according to claim 1 wherein said second film comprises a layer of evaporated tellurium.
4. The beam splitter according to claim 1 wherein said second film comprises germanium and tellurium.

References Cited

UNITED STATES PATENTS

| | | | |
|---|---|---|---|
| 1,777,308 | 10/1930 | Holweck | 350—288 X |
| 1,895,555 | 1/1933 | Reckmeier | 350—171 |
| 3,000,375 | 9/1961 | Golay | 350—1 X |
| 3,151,208 | 9/1964 | Alpert | 350—1 |
| 3,170,755 | 2/1965 | Imperial | 350—174 X |

FOREIGN PATENTS 440,006  12/1935  Great Britain.

DAVID SCHONBERG, *Primary Examiner.*

J. W. LEONARD, *Assistant Examiner.*

U.S. Cl. X.R.

29—527; 264—129; 356—108